US 7,370,288 B1

(12) United States Patent
Simmons et al.

(10) Patent No.: US 7,370,288 B1
(45) Date of Patent: May 6, 2008

(54) METHOD AND SYSTEM FOR SELECTING OBJECTS ON A DISPLAY DEVICE

(75) Inventors: Alex J. Simmons, Seattle, WA (US); Mark Yalovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 10/186,874

(22) Filed: Jun. 28, 2002

(51) Int. Cl.
*G06F 3/00* (2006.01)

(52) U.S. Cl. .................. 715/854; 715/860; 715/853; 715/856; 345/172

(58) Field of Classification Search ............... 715/733, 715/738, 764, 765, 835, 853, 854, 863, 864, 715/501.1, 856, 860; 345/168, 169, 172, 345/179
See application file for complete search history.

(56) References Cited

U.S. PATENT DOCUMENTS

| | | | | |
|---|---|---|---|---|
| 5,911,145 | A * | 6/1999 | Arora et al. ............... 715/514 |
| 5,963,208 | A * | 10/1999 | Dolan et al. ................ 715/760 |
| 6,188,405 | B1 * | 2/2001 | Czerwinski et al. ........ 715/764 |
| 6,199,125 | B1 * | 3/2001 | Cortesi .......................... 710/67 |
| 6,223,145 | B1 * | 4/2001 | Hearst ........................... 703/22 |
| 6,348,935 | B1 * | 2/2002 | Malacinski et al. ........ 715/853 |
| 6,380,957 | B1 * | 4/2002 | Banning ...................... 715/828 |
| 6,546,397 | B1 * | 4/2003 | Rempell ...................... 707/102 |
| 6,559,871 | B1 * | 5/2003 | Brozowski et al. ........ 715/853 |
| 6,650,347 | B1 * | 11/2003 | Nulu et al. .................. 715/853 |
| 6,727,927 | B1 * | 4/2004 | Dempski et al. ........... 715/853 |
| 2002/0126153 | A1 * | 9/2002 | Withers et al. ............. 345/773 |
| 2003/0066031 | A1 * | 4/2003 | Laane ........................... 715/513 |
| 2003/0085931 | A1 * | 5/2003 | Card et al. .................. 345/853 |
| 2003/0227491 | A1 * | 12/2003 | Moehrle ...................... 345/854 |
| 2005/0028081 | A1 * | 2/2005 | Arcuri et al. ............. 715/501.1 |

OTHER PUBLICATIONS

U.S. Official Action dated Jul. 13, 2005 in U.S. Appl. No. 10/186,812.
U.S. Office Action Summary dated Aug. 10, 2005, U.S. Appl. No. 10/186,820, filed: Jun. 28, 2002, entitled "Method and System for Categorizing Data Objects with Designation Tools," Inventor: Alex J. Simmons.
U.S. Office Action Summary dated Sep. 20, 2005, U.S. Appl. No. 10/186,865, filed: Jun. 28, 2002, entitled "System and Method for Automatically Recognizing Electronic Handwriting In An Electronic Document and Converting To Text," Inventor: Alex J. Simmons; Kurt Delbene.
U.S. Office Action Summary dated Jan. 27, 2006, U.S. Appl. No. 10/186,847, filed: Jun. 28, 2002, entitled "Method and System for Editing Electronic Ink," Inventor: Alex J. Simmons.

(Continued)

*Primary Examiner*—X. L Bautista
(74) *Attorney, Agent, or Firm*—Merchant & Gould (57) ABSTRACT

Different levels or categories of text or images or both can be selected on a display device with simple commands. A selection region including one of selected text and selected images can be increased or decreased depending upon an executed command. A first command can increase a selection region while a second and different second command can decrease a selection region. Once a maximum amount is selected by using the first command and if the first command is selected again, the selection region can return to the minimum amount of text and images that can be selected. And vice-versa.

8 Claims, 8 Drawing Sheets

OTHER PUBLICATIONS

U.S. Office Action Summary dated Mar. 13, 2006, U.S. Appl. No. 10/186,812, filed: Jun. 28, 2002, entitled "Resolving Document Object Collisions," Inventors: Alex J. Simmons, John D. Griffin.

Jakobsen, Thomas, "Advanced Character Physics," Copenhagen, Denmark; http://www.teknikus.kd/tj/gdc2001.htm.

U.S. Office Action Summary dated Apr. 21, 2006, U.S. Appl. No. 10/186,865, filed Jun. 28, 2002, "System and Method for Automatically Recognizing Electronic Handwriting in An Electronic Document and Converting To Text," Inventors: Alex J Simmons; Kurt DelBene.

Jakobsen, Thomas, "Advanced Character Physics," Copenhagen, Denmark; http://www.teknikus.kd/tj/gdc2001.htm, 2001.

* cited by examiner

| | Selection States | |
|---|---|---|
| 1. | All Node Elements in current Node | 1005 |
| 2. | All Nodes of Current Outline Object | 1010 |
| 3. | All Page Objects | 1015 |
| 4. | Entire Page | 1020 |
| 5. | All Pages of open File | 1025 |

METHOD AND SYSTEM FOR SELECTING OBJECTS ON A DISPLAY DEVICE

CROSS-REFERENCE TO RELATED PATENT APPLICATIONS

This patent application is related to the following co-pending non-provisional patent applications: U.S. patent application Ser. No. 09/852,799 filed on May 11, 2001, entitled "Serial Storage of Ink and Its Properties" and U.S. patent application Ser. No. 09/430,150 filed on Oct. 29, 1999, entitled "Universal File Format for Digital Rich Ink Data." Both related applications are assigned to the Microsoft Corporation.

This patent application is also related to the following non-provisional patent applications: U.S. patent application Ser. No. 10/186,388, entitled "Writing Guide for a Free-Form Document Editor", U.S. patent application Ser. No. 10/186,847, entitled "Method and System for Editing Electronic Ink"; U.S. patent application Ser. No. 10/186,812, entitled "Resolving Document Object Collisions"; U.S. patent application Ser. No. 10/186,837, entitled "Space Management for Electronic Documents"; U.S. patent application Ser. No. 10/186,865, entitled "System and Method for Automatically Recognizing Electronic Handwriting in an Electronic Document and Converting to Text"; U.S. patent application Ser. No. 10/186,820, entitled "Method and System for Designating Data Objects with Designation Tools"; U.S. patent application Ser. No. 10/186,463, entitled "Method and System for Displaying and Linking Ink Objects with Recognized Text and Objects". These applications and the application herein are all being filed on the same date, Jun. 28, 2002, and are assigned to the Microsoft Corporation. All of the aforementioned applications are hereby incorporated by reference.

TECHNICAL FIELD

The present invention relates to editing electronic documents and more specifically relates to a tool for selecting objects in an electronic document.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

With the widespread use of personal computers, textual information often is recorded using word processing software running on a personal computer. The advantage of such electronic methods of recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, recording notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen (also referred to as a stylus). A user can use the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink". This electronic tablet approach can be employed in a variety of ways including, on a personal computer and on a handheld computing device.

Recently, other computer systems have been developed that provide for more sophisticated creation and manipulation of electronic ink. For example, a conventional software application permits one to add electronic ink to a document. The application stores the ink and provides it to a user when requested. Other applications (for example, drawing applications associated with the Palm and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper.

Replicating the look and feel of physical ink requires computer systems that work with electronic ink to handle this electronic ink differently than traditional electronic text and images that can be displayed on a display device. Unlike word processors that handle only one or two types of page objects such as text and images, computer systems that work with electronic ink usually need to handle multiple types of page objects that can include bit map images, drawing objects, and outline objects. Each outline object can include one or more nodes where each node can include at least one of text, a picture, and an ink object.

Opposite to computer systems that work with electronic ink having different types of page objects, conventional word processors typically manipulate, and more specifically, select text or images or both by using either a series of key strokes or by using a series of screen pointer commands. For example, some word processors can select the text of a whole document by using keyboard commands such as "control-A". Other word processors can select a word in a paragraph of electronic text in response to a "single-click" of a mouse device. Further, a whole paragraph of electronic text can be selected in response to a "double-click" of a mouse device. A whole paragraph of electronic text can be deselected in response to a "single-click" of a mouse device if a whole paragraph was previously selected. While these commands for selecting text or images can be useful in conventional word processors, they do not provide for a complete, logical, and simple way for selecting page objects on computer systems that work with electronic ink.

In other words, because of the different page objects present in computer systems that work with electronic ink, there is a need in the art for manipulating, and more specifically, selecting and deselecting page objects in a manner that is unlike conventional word processors. There is a need in the art where the commands for selecting and deselecting page objects are complete, simple, and logical. There if a further need in the art that enables the selection of multiple page objects or all page objects without using a screen pointer such as a mouse or stylus.

SUMMARY OF THE INVENTION

The present invention provides a way to select different levels of objects comprising text or images or both on a display device with simple commands. The term, "select," can mean marking or identifying an object displayed on a display device for a later operation while the term, "selection region," can mean one or more elements on a display device that are selected for a later operation. The later operation could comprise deleting or copying the objects as a non-limiting example.

A selection region comprising one of selected text and selected images can be increased or decreased depending upon an executed command. A first command can increase a selection region while a second and different second command can decrease a selection region.

In other words, with execution of either the first or second command, the amount of images or text (or both) selected can be changed. Once a maximum amount is selected by using the first command and if the first command is selected again, the selection region can return to the minimum amount of text and images that can be selected. And vice-versa. That is, if a minimum amount is selected by using the second command and if the second command is selected again, the invention can return to the minimum amount of text and images that can be selected.

The commands can comprise simple key strokes. For example, the first command could comprise key strokes such as "Control-A." Meanwhile, the second command could comprise key strokes such as "Shift-Control-A." However, other key strokes or keys designed to execute these commands are not beyond the scope of the present invention.

The ability to select text and images in this manner can be attributed to how the text and images are stored and classified in memory. A first level for storing and classifying text and images in memory can comprise multiple pages that can be displayed on a display device. Each page can comprise page objects. A page object can comprise a bit map image, a drawing object, and an outline object. An outline object can comprise one or more nodes. Each node can comprise at least one of text, a picture, and an ink object.

A second level lower than the first level can comprise a single page that can be displayed on a display device. A third level lower than the second level can comprise one page object that is present on a page. A fourth level lower than the third level can comprise all nodes of a single outline object. A fifth level lower than the fourth level can comprise a single node in an outline object.

For an example representing expansion of a selection region on a display device, if an insertion point (usually manifested on a display device as a flashing line or cursor) is present in a node of an outline object and if the first command is executed for a first time, then all of the node elements of a current node including the node with the insertion point can be selected. If the first command is executed for a second iteration after the first time, all of the nodes of an outline object (which is the whole or entire object) can be selected on the current page displayed on the display device.

If the first command is executed for a third iteration after the second time, all of the page objects that can be displayed on the display device are selected. If the first command is executed for a fourth iteration after the third time, the entire page can be selected. If the first command is executed for a fifth iteration after the fourth time, then all of the pages in the file can be selected. If the first command is executed for a sixth iteration after the fifth time, then the selection region can return to a size as if the first command was executed for a first time and where all of the node elements are selected.

For an example representing reduction of a selection region on a display device, if an insertion point (usually manifested on a display device as a flashing line or cursor) is present in a node of an outline object and if the second command is executed for a first time, all of the pages in the file, including the page having the outline object which also contains the node with the insertion point can be selected.

If the second command is executed for a second time after the first time, the selection region can be reduced to include entire page is selected. And so on. Basically, the second command can reduce the selection region in a manner that is directly opposite to how the first command increases the selection region.

According to another exemplary aspect of the present invention, another command can be executed to select objects existing in different levels of memory on a particular page being displayed on a display device. Specifically, a selection region can be drawn with a pointing device and any page objects enclosed by the selection region can be selected even if the page objects are separate from one another.

DETAILED DESCRIPTION OF EXEMPLARY EMBODIMENTS

The present invention provides a way to select different levels or categories of text or images or both on a display device with a simple commands. A selection region comprising one of selected text and selected images can be increased or decreased depending upon an executed command. A first command can increase a selection region while a second and different second command can decrease a selection region. Once a maximum amount is selected by using the first command and if the first command is selected again, the selection region can return to the minimum amount of text and images that can be selected. And vice-versa.

An Exemplary Operating Environment

Figure 1:
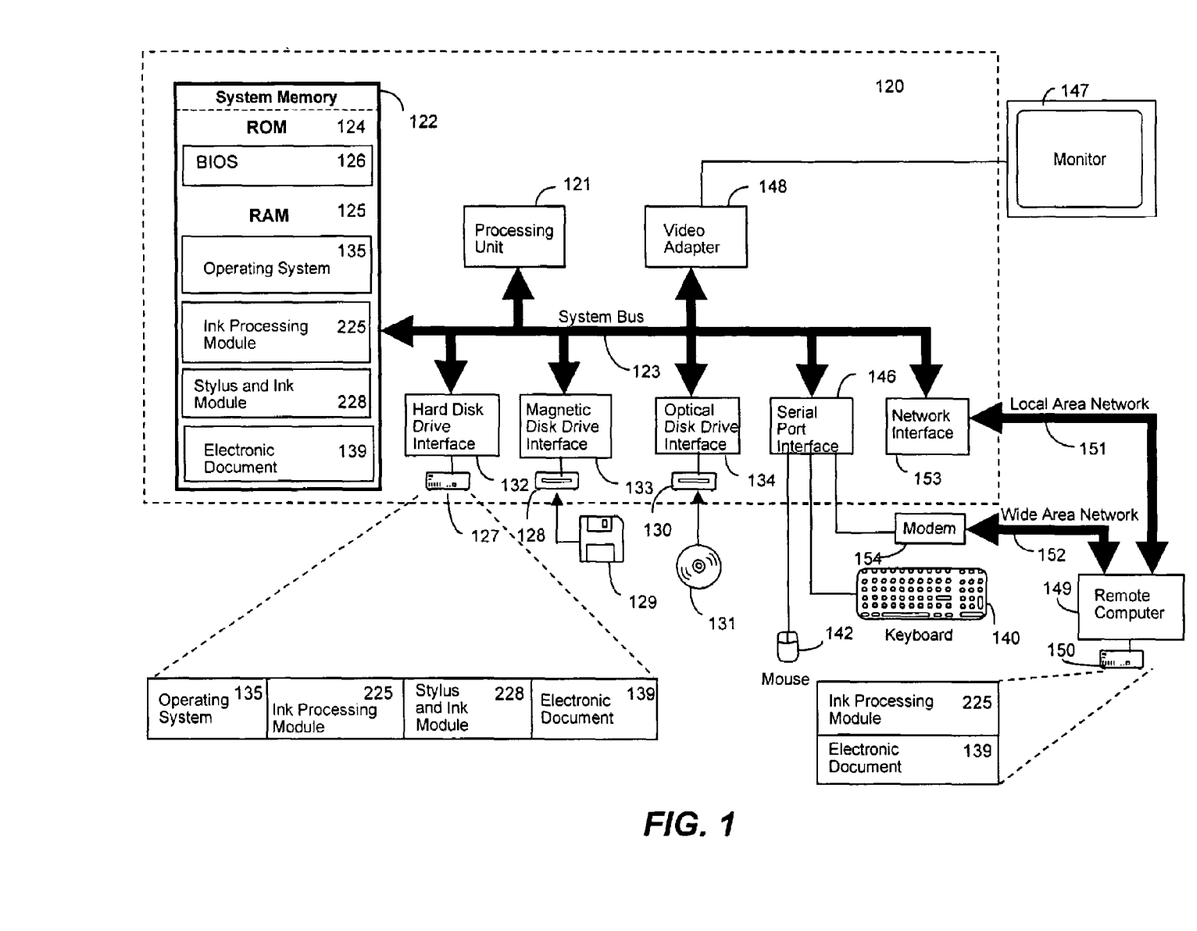
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a space management module 138, and an electronic document 139. Program modules include routines, sub-routines, programs, objects, components, data structures, etc., which perform particular tasks or implement particular abstract data types. Aspects of the present invention may be implemented in the form of a ink processing module 225 that can operate in concert with a stylus and ink module 228 to edit an electronic document 139.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
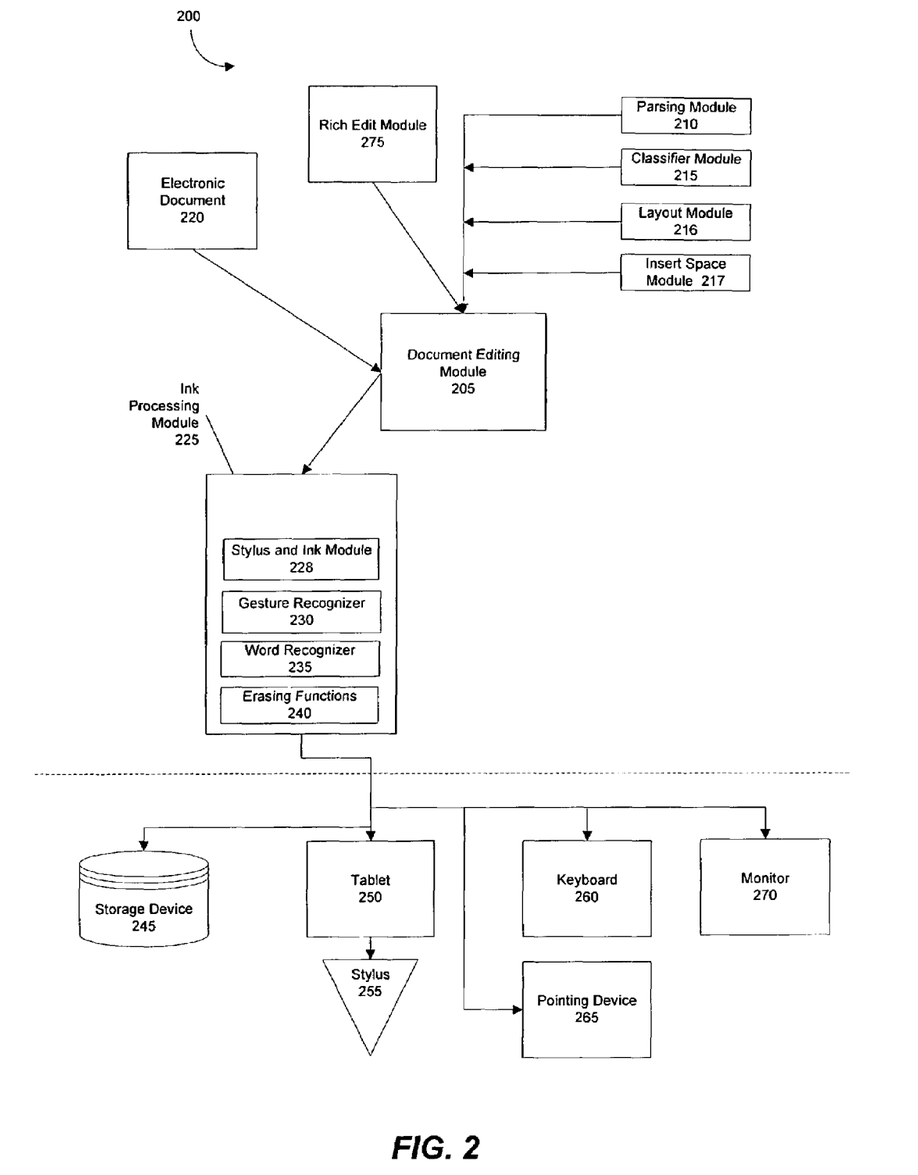
FIG. 2 is a block diagram depicting the primary functional components of an exemplary free-form document editor and related input devices.

Referring to FIG. 2, an exemplary architecture 200 is illustrated for editing electronic ink in accordance with an embodiment of the present invention. FIG. 2 shows typical hardware and software components used in operating the invention from a functional perspective. Conventional input devices are represented by the keyboard 260 and the pointing device (mouse) 265. A user can enter commands and information into the computer 20 using the input devices. Other input devices (not shown) may include a microphone, joystick, game pad, satellite dish, and scanner. A conventional output device, such as monitor 270, is used to display information from the computer 20. Other output devices (not shown) can include a printer or speaker. Other hardware components shown in FIG. 2 include an electronic tablet 250 and an accompanying stylus 255. The tablet 250 and stylus 255 are used to input handwriting strokes which are converted to collections of data that can be represented as electronic ink. The electronic ink may be incorporated into an electronic document 220 and may be displayed on either the electronic tablet 250, the monitor 270, or both. Although the electronic tablet 250 and the monitor 270 are illustrated as being distinct, in the preferred embodiment they are either coupled or form a single component. The joint tablet/monitor component has the ability to display information and receive input from the stylus 255. Also shown among the hardware components is a conventional electronic storage device 245.

In the representative architecture 200 all of the hardware components are coupled to an ink processing software module 225. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred and exemplary embodiment embodiment, the ink processing module 225 is a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink processing module 225 can also include an erasing functions module 240 for removing electronic ink that has been previously rendered.

Although ink processing modules are known in the art and necessary for an electronic tablet to function, what is needed is a document editing module, such as the one shown in FIG. 2, that enhances the performance of an electronic tablet. Specifically, document editing module 205 facilitates the manipulation of electronic ink so that a user can create and manipulate an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing. Software modules such as the layout module 216 and the insert space module 217 can be designed to control how electronic ink is rendered and moved. The editing modules shown in FIG. 2 are representative and those skilled in the art should understand that other modules may also be part of or coupled to the document editing module 205. For example, the document editing module 205 may also work with a rich edit module 275 that provides added functionality such as providing the text layout and wrapping for each individual node. Text, pictures, or ink can be processed by the rich edit module 275.

The present invention includes multiple computer programs which embodies the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Figure 3:
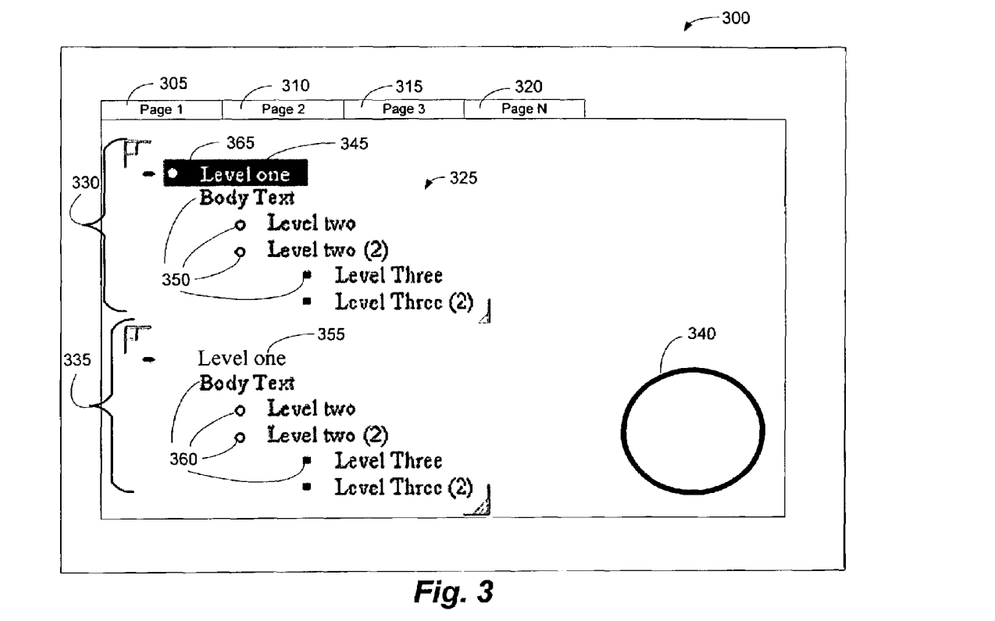
FIG. 3 is an exemplary display screen that illustrates the selection of node element according to one exemplary embodiment of the present invention.

Referring now to FIG. 3, exemplary display screen 300 can be generated by a display device such as the tablet 250 or monitor 270. However, the present invention is not limited to electronic tablet environments. The present invention can operate in any computer system that has display devices that may handle electronic ink, electronic text, or electronic images or any combination thereof. Exemplary display screen 300 can further comprise a first page 305, a second page 310, a third page 315, and a Nth page 320 where N can comprise an integer. For exemplary display screen 300, the first page is "active" meaning that its entire contents are displayed while the remaining pages are "inactive" meaning that their contents are not displayed. However, while the remaining pages other than the first page 305 are inactive, tab portions with the page numbers can be displayed on display screen 300 so that upon their selection, a particular page may be activated and the contents of the particular page can be displayed.

First page 305 comprises a first page object 325 and a second page object 340. According to one exemplary embodiment, three types of page objects can be displayed with the present invention: a picture (not illustrated), an outline object, and a drawing object. A picture in one exemplary embodiment comprises an image that has been inserted on an electronic page. Pictures can be inserted through exemplary commands such as "insert—picture" or by pasting a picture onto an electronic page or into an outline. Usually, a picture cannot be edited beyond resizing its dimensions.

A drawing object according to one exemplary embodiment comprises a collection of one or more ink strokes that exist on an electronic page. A drawing object can be created with the present invention using electronic ink and can be fully editable. For example, in one exemplary embodiment, electronic ink strokes can be erased or additional strokes can be added. In another exemplary embodiment, editing capabilities for a drawing object can be locked or the drawing object can be reclassified as an ink object (discussed below with respect to FIG. 9) so that the strokes can be treated as electronic ink and later recognized as text.

The present invention is not limited to these types and the number of page objects described. Different as well as fewer or greater number of page objects are not beyond the scope of the present invention.

The first page object 325 comprises an outline object. An outline object can comprise one or more nodes 330, 335. Each node may include node elements that comprise one of text, pictures (not illustrated), and ink objects (not illustrated). However, like the page objects discussed above, the present invention is not limited to the number and type of node elements. Different as well as fewer or greater number of node elements are not beyond the scope of the present invention.

The first page object or outline object 325 further comprises a first node 330 and a second node 335. First and second nodes 330, 335 according to the exemplary embodiment illustrated comprise text. Meanwhile, the second page object 340 comprises a drawing object. The drawing object comprises a circle, however, other drawing objects are not beyond the scope and spirit of the present invention.

The first node 330 can comprise a first node element 345 that comprises text such as "Level One." The first node 330 can further comprise secondary node elements 350 that also comprise text.

The second node 335 can comprise a first node element 355 that also comprises text such as "Level One." The secondary node 335 can further comprise secondary node elements 360 that also comprise text.

For the exemplary display screen 300 illustrated in FIG. 3, the first node element 345 of the first node 330 has been selected. As noted above, the term "selection" or "selected" can mean marking or identifying an object displayed on a display device for a later operation. In the exemplary embodiment illustrated in FIG. 3, a "selected" element is outlined with a dark or shaded portion meaning that the particular item selected is shaded with a color that is different than the selected screen item and different from the color of the screen itself. However, those skilled in the art recognize that there are other ways to indicate a selected element such as circumscribing a selected element with a dashed polygon such as a square or rectangle, and other like ways to denote a selected element.

The highlighted portion defines a selection region 365, where the term, "selection region," can mean one or more elements on a display device that are selected for a later operation. The later operation can comprise deleting or copying the objects as a non-limiting example.

The selection region 365 comprising one of selected text and selected images can be increased or decreased depending upon an executed command. The size of the selection region 365 is directly related to selection states as will be discussed in further detail below with respect to FIG. 10. In response to a first command, the selection region 365 can increase in size while in response to a second and different second command, the selection region 365 can decrease in size.

In other words, with execution of either the first or second command, the amount of images or text (or both) selected can be changed. Once a maximum amount is selected by using the first command and if the first command is selected again, the selection region 365 can return to the minimum amount of text and images that can be selected. And vice-versa. That is, if a minimum amount is selected by using the second command and if the second command is selected again, the selection region 365 can be returned to the minimum amount of text and images that can be selected.

The first and second commands can comprise simple key strokes. For example, the first command could comprise key strokes such as "Control-A." Meanwhile, the second command could comprise key strokes such as "Shift-Control-A." However, other key strokes or keys designed to execute these commands are not beyond the scope of the present invention. For a non-limiting example, a keyboard or key pad could comprise keys designed specifically for the first and second commands. Further, on screen buttons or icons could be designed specifically for the first and second commands.

Referring back to FIG. 3, the first node element 345 of the first node 330 is selected or highlighted with the selection region 365 in response to a first command according to a first embodiment of the present invention. In an exemplary embodiment, the first command can comprise the key strokes "control-A."

Figure 4:
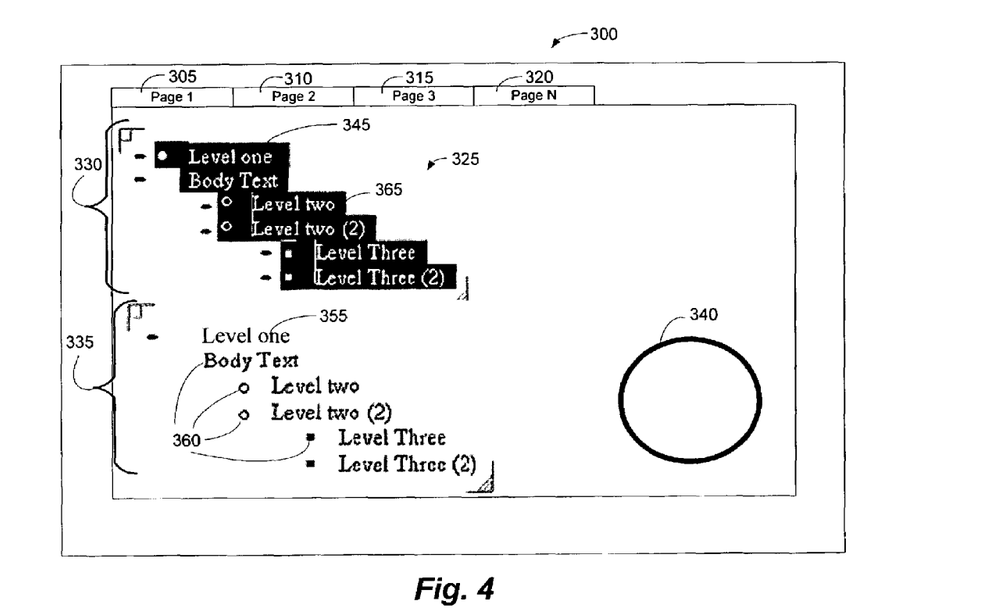
FIG. 4 is an exemplary display screen that illustrates the selection of all node elements of a current node according to one exemplary embodiment of the present invention.

Referring now to FIG. 4, this figure illustrates exemplary display screen 400 where the selection region 365 has been expanded to include the first node element of the first node 330 as well as the remaining node elements 350. The selection region 365 for this exemplary embodiment is made in response to a first execution of the first command that can comprise the key strokes, "control-A." The second command, as noted above, can comprise the key strokes "control-shift-A." FIG. 4 corresponds to the selection state 1005 as will be discussed in further detail below with respect to FIG. 10.

Figure 5:
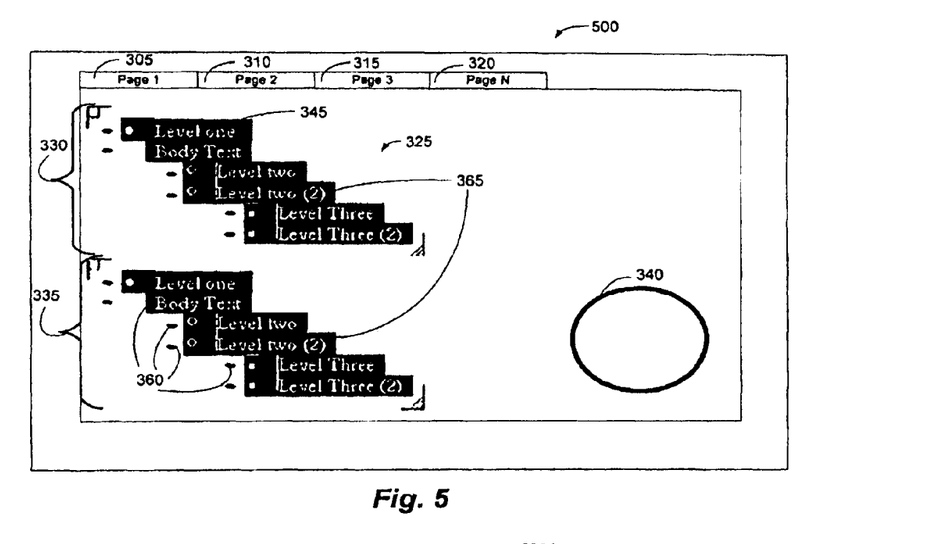
FIG. 5 is an exemplary display screen that illustrates the selection of all nodes of an outline object comprising two nodes according to one exemplary embodiment of the present invention.

Referring now to FIG. 5, this figure illustrates exemplary display screen 500 where the selection region 365 has been expanded to include both the first node 330 as well as the second node 335 of outline object 325. The selection region 365 was expanded in response to a second execution of the first command that can comprise the key strokes, "control-A." In response to an execution of the second command at this state illustrated in FIG. 5, it is noted that the selection region 365 would contract from its current size in FIG. 5 to its size illustrated in FIG. 4. The second command, as noted above, can comprise the key strokes "control-shift-A." FIG. 5 corresponds to the selection state 1010 as will be discussed in further detail below with respect to FIG. 10.

Figure 6A:
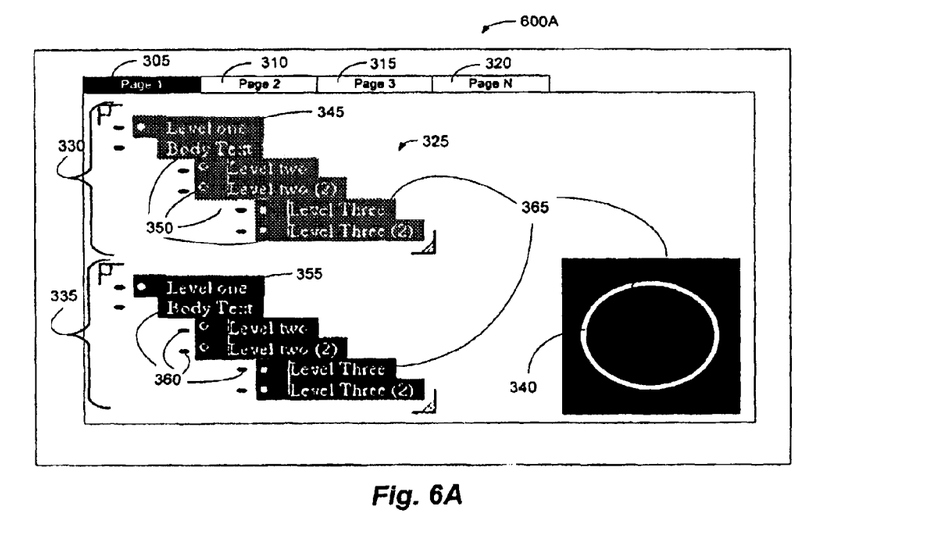
FIG. 6A is an exemplary display screen that illustrates the selection of all page objects of a first page according to one exemplary embodiment of the present invention.

Referring now to FIG. 6A, this figure illustrates exemplary display screen 600A where the selection region 365 has been expanded to include all page objects. That is, the selection region was expanded to include the entire outline object 325 as well as the second page object 340. The selection region 365 was expanded in response to a third execution of the first command that can comprise the key strokes, "control-A." In response to an execution of the second command at this state illustrated in FIG. 6A, it is noted that the selection region 365 would contract from its size in FIG. 6A to its size illustrated in FIG. 5. FIG. 6A corresponds to the selection state 1015 as will be discussed in further detail below with respect to FIG. 10.

Figure 6B:
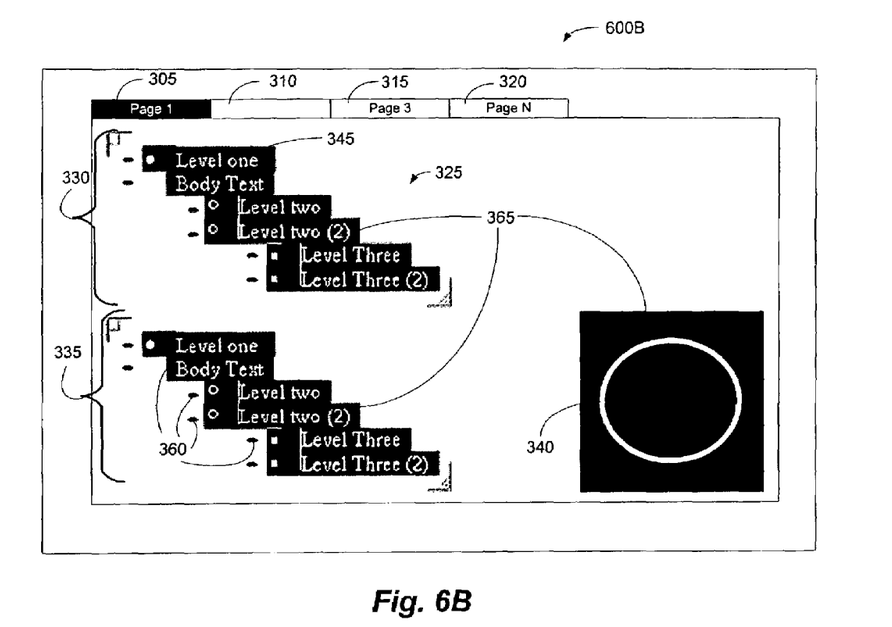
FIG. 6B is an exemplary display screen that illustrates the selection of the entire first page according to one exemplary embodiment of the present invention.

Referring now to FIG. 6B, this figure illustrates exemplary display screen 600B where the selection region 365 has been expanded to include the entire page. To indicate that an entire page has been selected, the tab having the "Page 1" designation has been highlighted. The selection region 365 was expanded in response to a fourth execution of the first command that can comprise the key strokes, "control-A." In response to an execution of the second command at this state illustrated in FIG. 6B, it is noted that the selection region 365 would contract from its size in FIG. 6B to its size illustrated in FIG. 6A. FIG. 6B corresponds to the selection state 1020 as will be discussed in further detail below with respect to FIG. 10.

Figure 7:
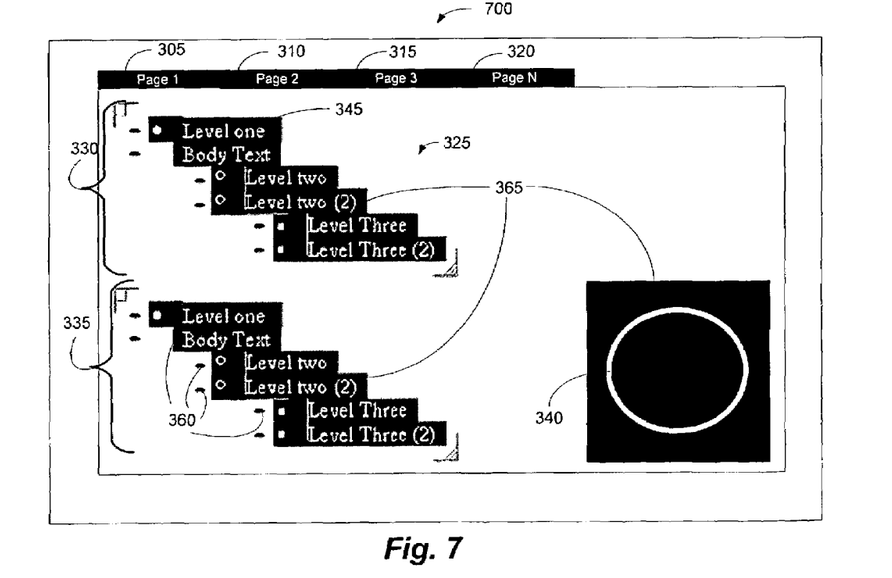
FIG. 7 is an exemplary display screen that illustrates the selection of all pages according to one exemplary embodiment of the present invention.

Referring now to FIG. 7, this figure illustrates exemplary display screen 700 where the selection region 365 has been expanded to include all pages in an electronic document. That is, the selection region was expanded to include all pages comprising pages 1 to N in a file. To indicate that each page has been selected, each tab having its respective page designation has been highlighted. The selection region 365 was expanded in response to a fifth execution of the first command that can comprise the key strokes, "control-A." In response to an execution of the second command at this state illustrated in FIG. 7, it is noted that the selection region 365 would contract from its size in FIG. 7 to its size illustrated in FIG. 6B. FIG. 7 corresponds to the selection state 1025 as will be discussed in further detail below with respect to FIG. 10.

Figure 8:
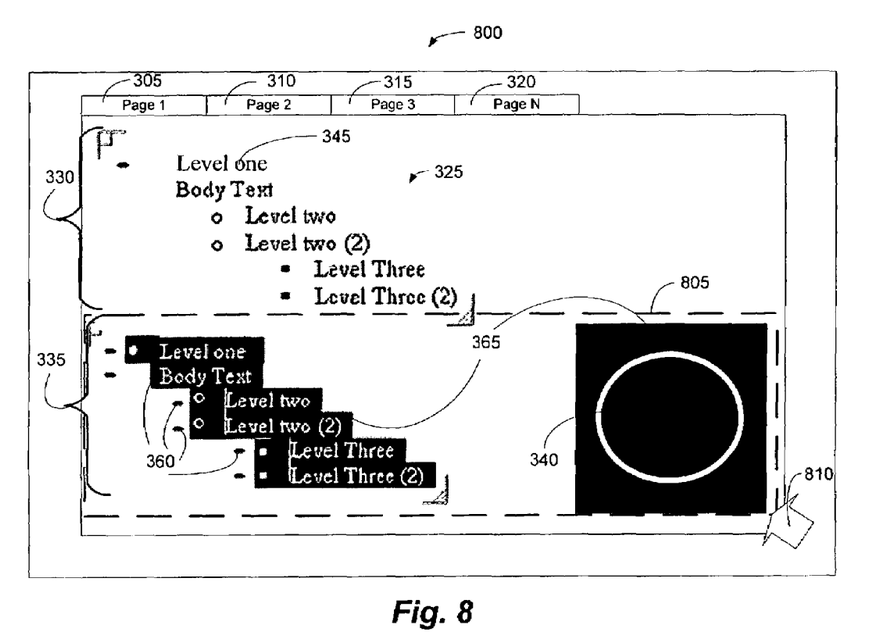
FIG. 8 is an exemplary display screen that illustrates the selection of a node that is part of an outline object and a drawing object with a screen pointing device according to an alternate exemplary embodiment of the present invention.

Referring now to FIG. 8, this figure illustrates exemplary display screen 800 of an alternate exemplary embodiment where the selection region 365 is controlled in response to a geometric region 805 formed with a screen pointing device 810. In this alternate exemplary embodiment, the geometric region 805 can comprise a rectangular shaped region. However, other shapes such as circular, triangular, and other like geometric shapes are not beyond the scope of the present invention. The screen pointing device 810 can comprise a mouse pointer, however, the present invention can employ other like screen pointing devices such as cross-hair responding to a stylus when the stylus contacts the screen. In response to the geometric region 805 illustrated in FIG. 8, the second node 335 of the outline object 325 has been selected with the second page object 340. Those skilled in the art recognize that the geometric region 805 can be expanded or collapsed to any size in order to include as many or as few page objects or portions of page objects that are desired.

Figure 9:
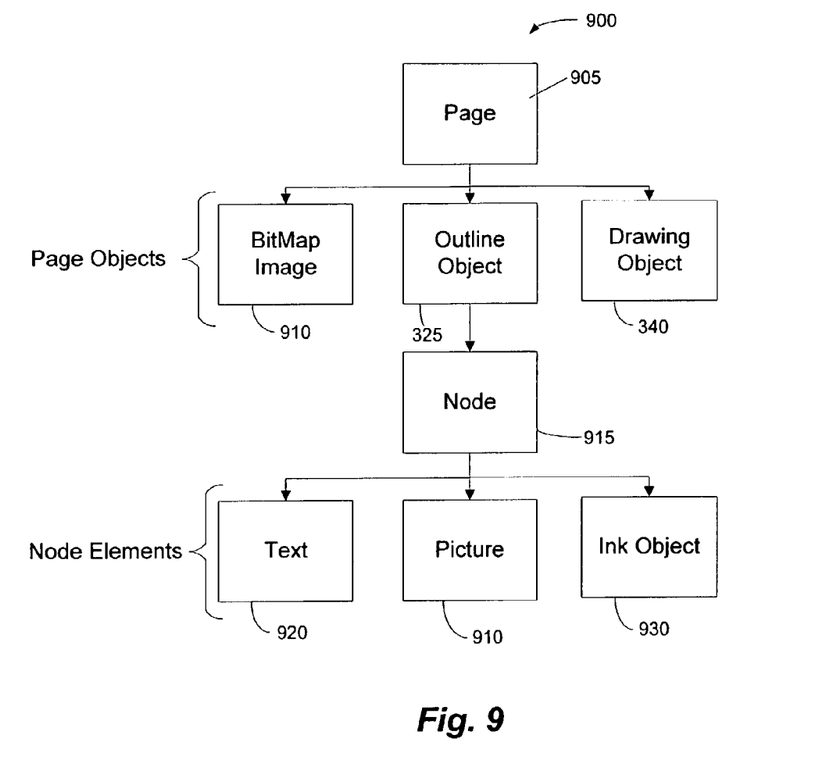
FIG. 9 is a functional block diagram illustrating the hierarchy of the different types of page objects that can be present on a display device according to one exemplary embodiment of the present invention.

Referring now to FIG. 9, this figure is a functional block diagram illustrating the hierarchy 900 of the different types of page objects that can be present on a display device according to one exemplary embodiment of the present invention. A page 905 can comprise one of three types of page objects: a bitmap image 910; an outline object 325; and a drawing object 340. However, those skilled in the art will recognize that other types of page objects are not beyond the scope of the present invention.

Each outline object can comprise one or more nodes 915. Each node 915 can comprise on of three types of node elements: text 920, a picture 910, and an ink object 930. However, similar to the page objects described above, those skilled in the art recognize different types of node elements are not beyond the scope and spirit of the present invention. An ink object 930, similar to a drawing object, typically comprises an object that is created with a stylus or some other screen pointing device that closely resembles how such an object would be formed with pen and paper. However, unlike a drawing object, an ink object 930 is usually classified or identified by the present invention as electronic ink text that can be converted into regular electronic text. Meanwhile, a picture 910 can comprise an existing image stored in a file in memory or an image that is formed with a software program.

Figure 10:
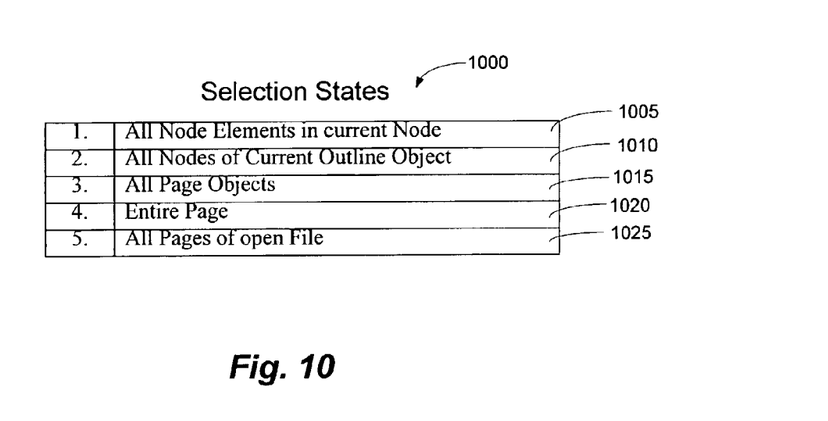
FIG. 10 is a table illustrating various selection states according to one exemplary embodiment of the present invention.

Referring now to FIG. 10, this figure illustrates a table 1000 comprising various selection states according to one exemplary embodiment of the present invention. These selection states directly correspond with the size of the selection region 365. A first selection state 1005 comprises highlighting all node elements relative to the insertion point of a current node element. This first selection state 1005 is achieved upon a first execution of the first command comprising the keystrokes "control-A" as discussed above. The first selection state 1005 is also obtained if the second command is executed and if the current state is the second selection state 1010.

The second selection state 1010 comprises highlighting all nodes 915 of the current outline object. The second selection state is achieved upon a second execution of the first command comprising the keystrokes "control-A" as discussed above. The second selection state 1005 is also obtained if the second command is executed and if the current state is the third selection state 1015.

The third selection state 1015 comprises all page objects 325, 340, 910 of the current page being displayed on the display device. The third selection state is achieved upon a third execution of the first command comprising the keystrokes "control-A" as discussed above. The third selection state 1005 is also obtained if the second command is executed and if the current state is the fourth selection state 1020.

The fourth selection state 1020 comprises highlighting the entire page 905. The entire page can include all page objects as well as all objects in a title area that may be separate and adjacent to the current page being displayed on a display device. However, it is noted that the all page objects state or third selection state 1015 does not include objects in the title area (i.e. the third selection state 1015 usually only includes objects on the electronic page being displayed). The fourth selection state 1020 comprising the entire page is achieved upon a fourth execution of the first command comprising the keystrokes "control-A" as discussed above. The fourth selection state 1020 is also obtained if the second command is executed and if the current state is the fifth selection state 1025.

The fifth selection state 1025 comprises highlighting all pages 905 in the file being reviewed. The fifth selection state is achieved upon a fifth execution of the first command comprising the keystrokes "control-A" as discussed above. The fifth selection state 1025 is also obtained if the second command is executed and if the current state is the first selection state 1010.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 11:
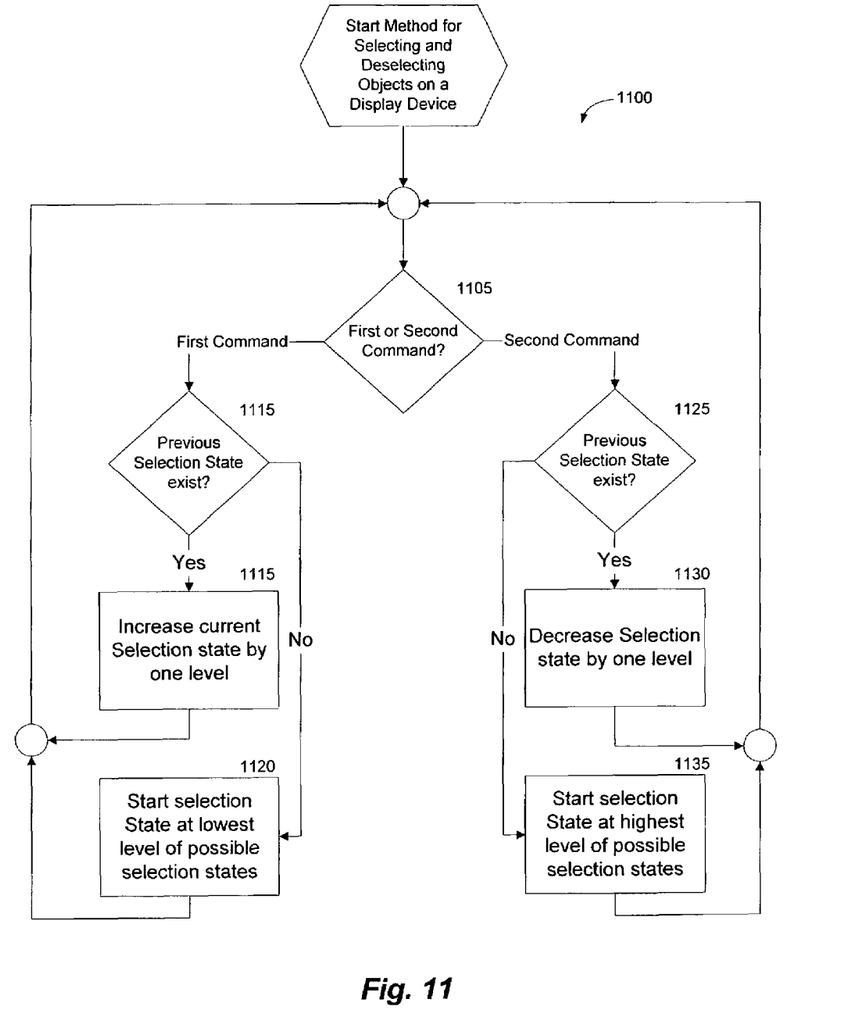
FIG. 11 is a logic flow diagram illustrating an overview of an exemplary process for selecting page objects on a display device according to one exemplary embodiment of the present invention.

Referring now to FIG. 11, this figure is an exemplary logic flow diagram illustrating a computer implemented process 1100 for selecting page objects on a display device. Decision step 1105 is the first step of the process 1100. In decision step 1105, it is determined whether a first command or second command has been received. If the inquiry to decision step 1105 is that the first command has been received then the "First Command" branch is followed to decision step 1110 in which it is determined if a previous selection state exists. If the inquiry to decision step 1105 is that the second command has been received then the "Second Command" branch is followed to decision step 1125 in which it is determined if a previous selection state exists.

If the inquiry to decision step 1110 is positive, then the "yes" branch is followed to step 1115 in which the current selection state is increased by one level. If the inquiry to decision step 1110 is negative, then the "no" branch is followed to step 1120 in which the selection state is started at the lowest level of selection relative to the position of the insertion point. The process then returns back to decision step 1105.

If the inquiry to decision step 1125 is positive, then the "yes" branch is followed to step 1130 in which the current selection state is decreased by one level. If the inquiry to decision step 1110 is negative, then the "no" branch is followed to step 1135 in which the selection state is started at the highest level of selection. The process then returns back to decision step 1105.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for selecting and unselecting page objects displayed in an electronic document on a display device, comprising the steps of:

classifying and storing the page objects in memory according to a hierarchy that includes a plurality of levels, the plurality of levels including a first level of page objects and a second level of page objects associated with one or more pages of the electronic document, wherein the first and second level of page objects in the hierarchy include at least one node, the at least one node comprising at least one node element comprising text;

receiving an execution of a first command to select the first level of page objects displayed in the electronic document in a current selection state, wherein the current selection state comprises a highlight region for selecting at least the at least one node element in the first level of page objects, wherein subsequent executions of the first command increases the size of the highlight region to a maximum, the maximum highlight region selecting at least the first level of page objects, the second level of page objects associated with the one or more pages of the electronic document, and additional objects displayed on the one or more pages of the electronic document which are not within the first and second levels of page objects, wherein the execution of the first command after the highlight region is at a maximum contracts the size of the highlight region from the maximum to a region selecting less than at least the first level of page objects, the second level of page objects associated with the one or more pages of the electronic document, and additional objects displayed on the one or more pages of the electronic document which are not within the first and second levels of page objects; and receiving an execution of a second command to select at least the first level of page objects displayed in the electronic document in a current selection state, wherein subsequent executions of the second command decreases the size of the highlight region to a minimum, the minimum highlight region selecting only a node element in the first level of page objects, wherein the execution of the second command after the highlight region is at the minimum increases the highlight region to the maximum highlight region selecting at least the first level of page objects, the second level of page objects associated with the one or more pages of the electronic document, and additional objects displayed on the one or more pages of the electronic document which are not within the first and second levels of page objects.

2. The method of claim 1, wherein each execution of the first command and the second command comprises striking one of a key on a key board and a special key designed for the commands.

3. The method of claim 1, wherein the page objects comprise one of text and images that are displayable on a display device.

4. The method of claim 1, wherein the first level of page objects further comprises one of multiple pages; one of a bit map image, a drawing object, and an outline object, wherein the at least one node is within an outline, each node comprising one of text, a picture, and an ink object; and the second level of page objects comprises a level higher than the first level of page objects.

5. A computer system for selecting page objects, comprising:

a processing unit;

a memory storage device;

a display device coupled to the processing unit for displaying data; and a program stored in the memory storage device for providing instructions to the processing unit; the processing unit responsive to the instructions of the program, operable for classifying and storing the page objects in memory according to a memory structure that comprises multiple groups, wherein the page objects are associated with one or more pages and wherein each group comprises a level in a hierarchical classification of displayable objects;

receiving an execution of a first command to select a first group from the page objects displayed in a current selection state, wherein the current selection state comprises a highlight region for selecting at least one node element in the first group of page objects, wherein subsequent executions of the first command increases the size of the highlight region to a maximum, the maximum highlight region selecting at least the first group of page objects, a second group of page objects, and additional objects displayed on one or more pages of an electronic document comprising the first and second groups which are not within the first and second group of page objects, wherein the execution of the first command after the highlight region is at a maximum contracts the size of the highlight region from the maximum to a region selecting less than the maximum highlight region; and receiving an execution of a second command to select at least the first group of page objects in a current selection state, wherein subsequent executions of the second command decreases the size of the highlight region to a minimum, the minimum highlight region selecting only a node element in the first group of page objects, wherein the execution of the second command after the highlight region is at the minimum increases the highlight region to the maximum highlight region.

6. The system of claim 5, wherein each object comprises at least one of text and an image.

7. The system of claim 5, wherein the computer system comprises a hand held device.

8. The system of claim 5, wherein the computer system comprises a hand held device and a stylus.

\* \* \* \* \*